No. 726,052. PATENTED APR. 21, 1903.
C. HAGENMÜLLER.
APPARATUS FOR THE TREATMENT OF YEAST.
APPLICATION FILED OCT. 13, 1902.

NO MODEL.

Witnesses:

Inventor
Christian Hagenmüller
By James L. Norris
Atty.

UNITED STATES PATENT OFFICE.

CHRISTIAN HAGENMÜLLER, OF ERFURT, GERMANY.

APPARATUS FOR THE TREATMENT OF YEAST.

SPECIFICATION forming part of Letters Patent No. 726,052, dated April 21, 1903.

Application filed October 13, 1902. Serial No. 127,086. (No model.)

*To all whom it may concern:*

Be it known that I, CHRISTIAN HAGENMÜLLER, manufacturer, a subject of the King of Prussia, German Emperor, residing at Erfurt, in the Kingdom of Prussia, German Empire, have invented certain new and useful Improvements in Apparatus for the Treatment of Yeast, of which the following is a specification.

My invention relates to an apparatus for developing, aerating, and washing yeast.

My apparatus is adapted for treating the yeast with compressed air in a funnel-shaped receptacle capable of being tilted. For this purpose an injector is detachably arranged in the funnel-shaped receptacle and is connected with an air-pressure supply, whereby each cell of the yeast is subjected to such a motion as to be repeatedly brought in contact with the air, which thus completely saturates the yeast with air and increases its fermentative powers.

My improved apparatus is shown in the accompanying drawings, in which—

Figure 1:
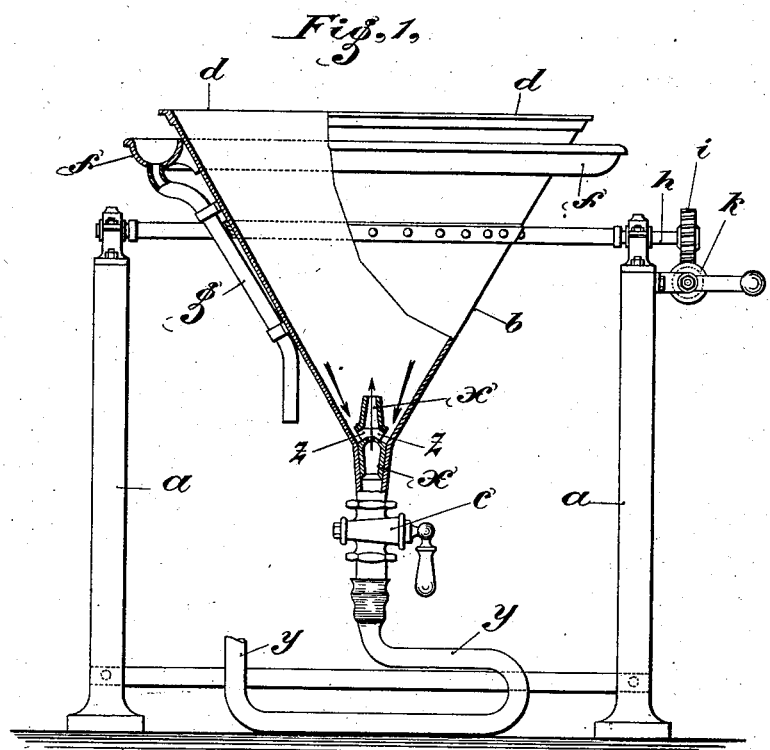
Figure 2:
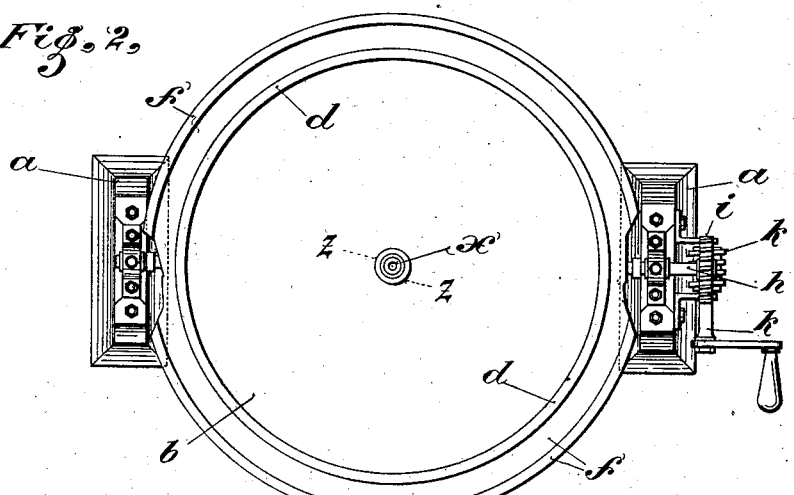

Figure 1 is a side elevation of the apparatus, partly in section; and Fig. 2, a top plan view of the same.

The funnel-shaped receptacle $b$ is rotatably suspended from a support $a$ and at its lower portion provided with a tap $c$. This tap can, through a hose $y$ or tube or the like, be connected with an air-pressure conduit. At the bottom of the receptacle $b$ is arranged an injector $x$ in an easily-detachable manner.

The operation is as follows: After the yeast to be developed or aerated is introduced with an addition of beerwort into the receptacle $b$, filling about one-third of its capacity, the tap $c$ is opened. The air entering the receptacle whirls the yeast and comes into direct contact with each single particle thereof, this being due to the influence of the injector $x$, which sucks up through lateral passages $z$ the yeast cells or particles which settle at the bottom of the receptacle $b$ and whirls them up again. They are thus continually subjected to the air-current until the tap $c$ is closed. The discharge of the aerated yeast is effected by tilting the receptacle $b$, preferably by means of a worm-gear $h\ i\ k$, adapted to be operated by a crank-handle. This gear could, of course, be substituted by any suitable equivalent mechanism.

If the injector $x$ by being simply lifted be removed from the receptacle $b$ and the hose $y$ be attached to a water-pressure supply, the apparatus can without difficulty at once be made use of as a washing device for the yeast. In this case the receptacle $b$ is provided beneath its upper edge $d$ with a circular trough $f$ and a discharge-conduit $g$. The operation is then as follows: The drained yeast to be washed is poured into the receptacle when in its vertical position, and the tap $c$ is opened. The water under pressure produces in the receptacle a strong whirl which upon the level of the water rising drives the lighter particles of the yeast to the top, while the heavier and sound particles of the yeast sink to the bottom. The admission of water is continued until the impurities and the feeble particles of the yeast are carried away over the edge $d$ of the receptacle $b$ through the trough $f$ and the tube $g$. The sound and specifically heavier particles of the yeast are not carried away with the washed water, but sink and settle down near the walls of the funnel, where the jet of water coming from below is ineffective. After the yeast is sufficiently washed in this manner the tap $c$ is closed, and the funnel $b$ is tilted by means of the worm-gear $h\ i\ k$ in order to discharge its contents.

Having now particularly described and ascertained the nature of my said invention and in what manner the same is to be performed, I declare that what I claim is—

1. In an apparatus for the treatment of yeast, a funnel-shaped receptacle having an inlet at the lower end thereof; means for controlling said inlet; a trough surrounding the upper portion of said receptacle; an outlet from said trough; and means for discharging the contents of said receptacle.

2. In an apparatus for the treatment of yeast, a pivoted funnel-shaped receptacle having an inlet at its lower end, a tappet controlling said inlet, a trough surrounding the upper portion of said receptacle, and means for tilting said receptacle to discharge the contents thereof.

In testimony whereof I have hereunto set my hand in presence of two subscribing witnesses.

CHRISTIAN HAGENMÜLLER.

Witnesses:
PAUL TEICHMANN,
OTTO HORNBOGEN.